May 14, 1957     A. K. CAMPBELL     2,791,904
TORQUE TESTING TOOL
Filed May 31, 1955
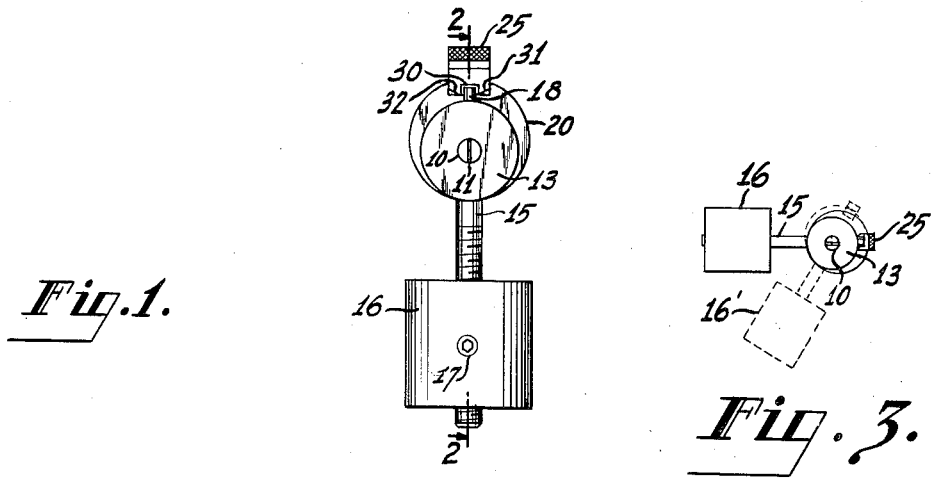
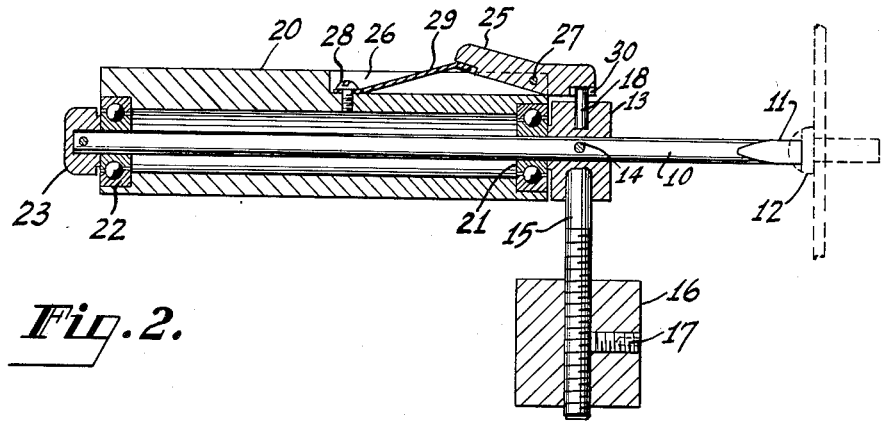
INVENTOR.
ARTHUR K. CAMPBELL
BY
Charles H. Brown
ATTORNEY

United States Patent Office 2,791,904
Patented May 14, 1957

2,791,904

TORQUE TESTING TOOL

Arthur K. Campbell, Long Island City, N. Y., assignor to Radio Corporation of America, a corporation of Delaware Application May 31, 1955, Serial No. 511,871

The terminal fifteen years of the term of the patent to be granted has been disclaimed 5 Claims. (Cl. 73—139)

This invention relates to a torque testing tool, and more particularly to a tool for testing and adjusting the tightness of a screw, bolt or nut.

It is an object of this invention to provide an improved tool for accurately testing torques of low value, such as six inch-ounces.

It is another object to provide an improved tool for testing and adjusting the torque of a screw or the like on a small assembly which can be held in the hand of the operator.

It is a further object to provide an improved torque testing tool employing the beam balance or weighted arm principle.

An illustrative embodiment of the invention includes a shaft adapted at one end for engaging a screw or the like to be tested. A weight arm is fixed at one end to the shaft and extends at right angles from the shaft. A handle is mounted on the shaft in a manner permitting free rotation about the axis of the shaft. A manually operable clutch or detent mechanism permits the handle to be locked against rotation on the shaft. In use, the clutch or detent is locked and the tool is held in engagement with the screw being tested and with the weight arm extending horizontally. The clutch or detent is then unlocked to determine whether or not the torque exerted by the weight arm is sufficient to turn the screw.

These and other objects and aspects of the invention will be apparent to those skilled in the art from the following more detailed description taken in conjunction with the appended drawings, wherein:

Figure 1 is an end view of a torque testing tool constructed according to the teachings of this invention;

Figure 2 is a longitudinal sectional view taken on the line 2—2 of Figure 1; and Figure 3 is a diagrammatic end view which will be referred to in describing the operation of the tool shown in Figures 1 and 2.

The torque testing tool shown in Figures 1 and 2 of the drawings includes a shaft 10 provided at one end 11 with a screw driver tip for engaging the cerf of a screw 12 to be tested. The end 11 of the shaft 10 may, of course, be adapted to engage the head of a bolt or a nut. A collar 13 is fixed on the shaft 10 by means of a drive pin 14.

A weight arm 15 is pressed or driven into a radially extending hole in the collar 13. The free end of the weight arm 15 is threaded to receive a weight 16 which is correspondingly threaded. The weight may therefore be positioned at various distances from the shaft 10 and locked in place by means of a set screw 17. A clutch or detent pin 18 is pressed or driven into a radially extending hole on the opposite side of the collar 13. The parts thus far described are rigidly fixed on the shaft 10.

A barrel or tubular handle 20 is mounted on the shaft 10 to freely rotate about the axis of the shaft 10. Freely rotatable mounting is provided by means of ball bearings 21 at one end and ball bearings 22 at the other end of the handle 20. A protective end cap 23 is mounted on the end of the shaft 10.

A clutch or detent mechanism is provided including a trigger 25 set in a longitudinal groove 26 in the handle 20 and pivotally mounted on the handle by means of a pivot pin 27. A leaf spring 29 is fastened at one end by means of screw 28 in the groove 26 of handle 20. The other end of the spring 29 engages one end of the trigger 25 and urges it upwardly. The other end of the trigger 25 is urged downwardly towards the collar 13.

The end of the trigger 25 adjacent the collar 13 is provided with a groove 30 dimensioned to receive the end of the pin 18 extending from the collar 13. The sides of the trigger 25 are beveled at 31 and 32 so that when the shaft 10 and collar 13 are rotated with respect to the handle 20, the pin 18 will raise the adjacent end of the trigger 25 and permit the pin 18 to fall into the groove 30 in the trigger 25. The handle 20 is then fixed in position relative to the shaft and other parts, the position being that shown in the drawings. The handle 20 may be disengaged from the shaft and other parts by pressing the trigger 25 against the force of spring 29. This disengages the trigger 25 from the pin 18.

In using the tool, the clutch or detent is placed in the lock position as shown in the drawings, the screw driver tip 11 is placed in the cerf of the screw 12 on the assembly being tested, and the assembly and handle 20 of the tool are held so that the weight arms 15, 16 extend out horizontally from the shaft 10 as shown in Figure 3 of the drawings. The trigger 25 is then depressed to release the pin 18 from the groove 30 in the trigger 25. This disconnects the shaft and weighted arms 15, 16 from the handle 20. If the screw 12 is not tight enough, the weight 16 will fall to a position such as represented by the dotted line weight 16' of Fig. 3. The tool is then removed from the screw 12 and given a flip to cause the weight 16, collar 13 and shaft 10 to rotate in the handle 20 until the pin 18 engages the beveled edge 31 or 32 of the trigger and stops in the groove 30. The tool is then used as a screw driver to tighten the screw 12. The torque of the screw is again tested as described above. The process is repeated until the weight 16 falls a barely perceptible amount when the detent is released. If the screw 12 is initially too tight so that the weight 16 does not perceptibly fall, the screw is loosened and retested until the weight falls a barely perceptible amount when the clutch or detent is disengaged.

So long as the weight 16 is locked in position on the arm 15 and the ball bearings 21 and 22 remain substantially frictionless, the tool provides a means for measuring torque with great accuracy. The tool may be used indefinitely without recalibration. Any desired torque within a range of values may be measured by appropriately positioning the weight 16 on the arm 15.

What is claimed is:

1. A torque testing tool for testing the tightness of a screw or the like, comprising, a shaft having one end adapted to engage the screw or the like to be tested, a weight arm fixed at one end to said shaft and extending substantially radially therefrom, a weight adjustably mounted on said weight arm, a handle mounted on said shaft in a manner permitting free rotation about the axis of the shaft, and a manually operable clutch between said handle and said shaft.

2. A torque testing tool for testing the tightness of a screw or the like, comprising, a shaft having one end adapted to engage the screw or the like to be tested, a collar fixed on said shaft, a weight arm fixed at one end to said collar and extending substantially radially from said shaft, a weight mounted on said weight arm and adjustable along said arm, a handle mounted on said shaft in a manner permitting free rotation about the axis of the shaft, and a manually operable clutch between said handle and said collar.

3. A torque testing tool for testing the tightness of a screw or the like, comprising, a shaft having one end adapted to engage the screw or the like to be tested, a collar fixed on said shaft, a weight arm fixed at one end to said collar and extending substantially radially from said shaft, said arm havin torque graduations, a movable weight of predetermined mass mounted on said arm, said weight being adjustable on said arm to one of said graduations, a handle mounted on said shaft in a manner permitting free rotation about the axis of the shaft, and a spring biased detent mounted on said handle for engagement with said collar.

4. A torque testing tool for testing the tightness of a screw, comprising, a shaft having a screw driver tip on one end, a collar fixed on said shaft, a weight arm fixed at one end to said collar and extending substantially radially from said shaft, a hollow handle surrounding a portion of said shaft, ball bearings between said handle and said shaft to permit free rotation of said handle about the axis of said shaft, a pin extending from said collar, a trigger pivotally mounted on said handle and having one end adapted to engage said pin, and a spring between the other end of said trigger and said handle.

5. A torque testing tool as defined in claim 4 wherein the end of said trigger adapted to engage said pin includes a central groove and beveled outside edges, whereby said pin can raise the trigger and fall into said groove.

References Cited in the file of this patent
UNITED STATES PATENTS

| | | |
|---|---|---|
| 1,981,960 | Lewis | Nov. 27, 1934 |
| 2,094,405 | Leibing | Sept. 28, 1937 |
| 2,400,978 | Collins | May 28, 1946 |
| 2,464,372 | Booth | Mar. 15, 1949 |
| 2,486,632 | Burke | Nov. 1, 1949 |
| 2,607,219 | Millard | Aug. 19, 1952 |